(12) United States Patent
Smith

(10) Patent No.: US 10,255,693 B2
(45) Date of Patent: Apr. 9, 2019

(54) MACHINE LEARNING CLASSIFICATION AND TRAINING FOR DIGITAL MICROSCOPY IMAGES

(71) Applicant: TechCyte, Inc., Orem, UT (US)

(72) Inventor: Richard Boyd Smith, Orem, UT (US)

(73) Assignee: Techcyte, Inc., Orem, UT (US)

( * ) Notice: Subject to any disclaimer, the term of this patent is extended or adjusted under 35 U.S.C. 154(b) by 29 days.

(21) Appl. No.: 15/585,045

(22) Filed: May 2, 2017

(65) Prior Publication Data
US 2018/0322660 A1 Nov. 8, 2018

(51) Int. Cl.
*G06T 7/00* (2017.01)
*G06K 9/62* (2006.01)

(52) U.S. Cl.
CPC .............. *G06T 7/97* (2017.01); *G06K 9/6267* (2013.01); *G06T 2207/10056* (2013.01); *G06T 2207/20081* (2013.01)

(58) Field of Classification Search
CPC ............. G06T 7/97; G06T 2207/10056; G06T 2207/20081; G06K 9/6267
USPC ........................................................ 382/159
See application file for complete search history.

(56) References Cited

U.S. PATENT DOCUMENTS

| | | | |
|---|---|---|---|
| 2006/0204121 A1* | 9/2006 | Bryll | G06K 9/6288 382/255 |
| 2013/0322741 A1* | 12/2013 | Lee | G06K 9/6256 382/159 |
| 2016/0350914 A1* | 12/2016 | Champlin | G06T 7/0012 |

* cited by examiner

*Primary Examiner* — Ping Y Hsieh
(74) *Attorney, Agent, or Firm* — Terrence J. Edwards; TechLaw Ventures, PLLC

(57) ABSTRACT

Systems, methods, and devices for training models or algorithms for classifying or detecting particles or materials in microscopy images are disclosed. A method includes receiving a plurality of microscopy images of a specimen and a classification for the specimen. The plurality of microscopy images includes a first image captured at a first magnification and a second image captured at the first magnification with a different focus than the first image. The method includes training a machine learning model or algorithm using the plurality of images, wherein the first image and the second image are provided with one or more labels indicating the classification.

20 Claims, 8 Drawing Sheets

MACHINE LEARNING CLASSIFICATION AND TRAINING FOR DIGITAL MICROSCOPY IMAGES

TECHNICAL FIELD

The present disclosure relates to systems and methods for identifying particles and more particularly relates to systems, methods, and platforms for imaging and machine learning classification or detection of particles or substances.

DETAILED DESCRIPTION

Figure 1:
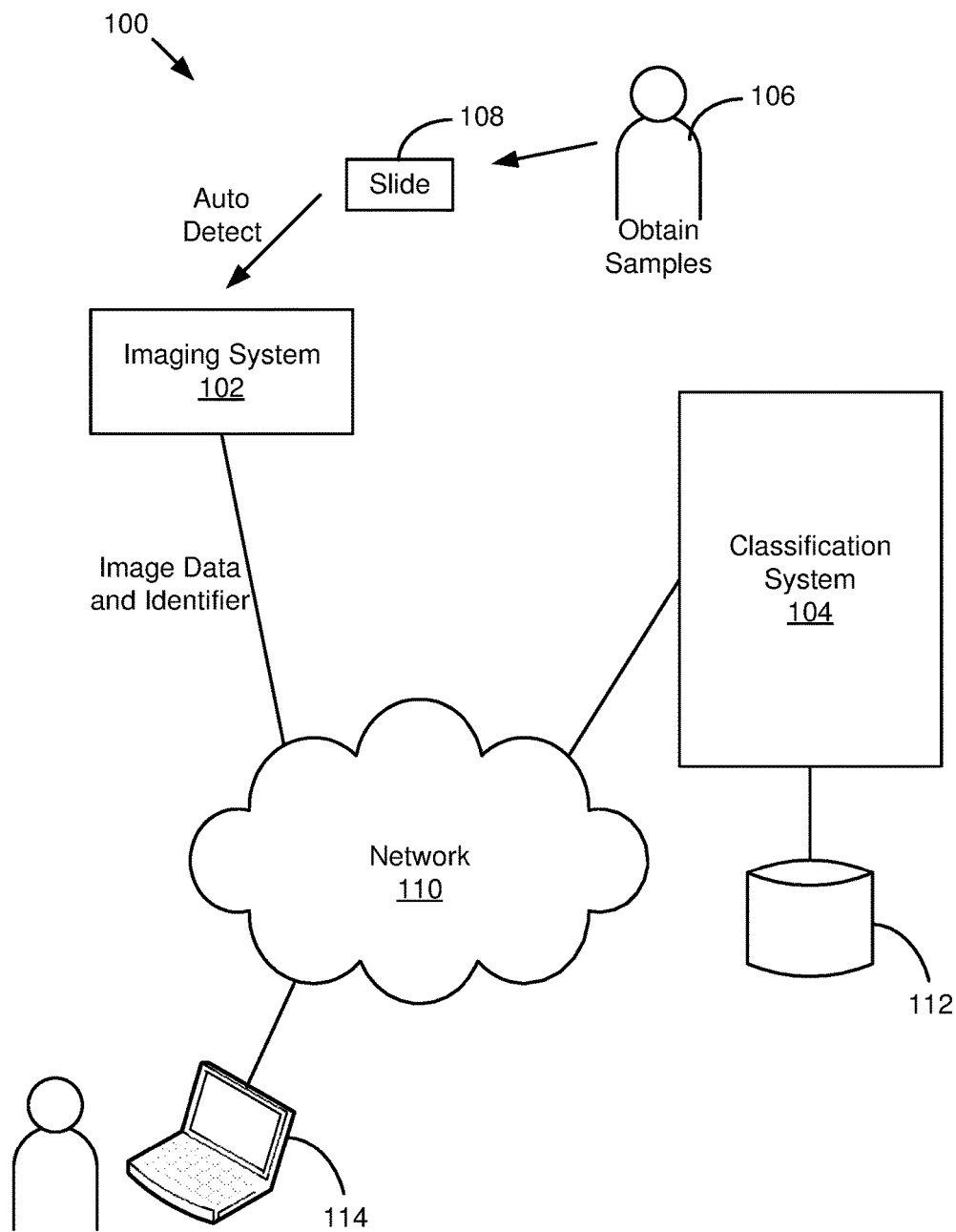
FIG. 1 illustrates a schematic diagram of a system for imaging and machine learning classification or detection of particulates or materials in accordance with the teachings and principles of the disclosure.

The present application discloses systems, methods, and devices for obtaining and classifying or detecting particulates or materials using digital imaging, such as digital microscopy. Information about the particles or materials present in a location or environment may be of great interest for research, medical, or other purposes. For example, particles in a body, soil, living environment, or any other location may be used to determine information about medical or ecology health, forensics, or the like. Example sample types include tissue, bone, fecal, blood, urine, sputum, infection disease, cervical mucus, vaginal fluid, milk, semen, geological, forensics, agricultural samples, or insect or small animal samples. Further details about sample types and their uses are provided below.

According to one embodiment, samples of particles or materials may be obtained and placed on a sample slide. Sample slides may include slides on which a sample material can be placed for review and imaging. For example, a sample may include particulates that were suspended or located in air, liquid, soil, body or plant tissue, or on a surface in a building, furniture, appliance or other location. The sample slide may include a transparent slide that may be used to protect and/or view the particulates captured in the sample. For example, a technician or user may obtain a sample and place the sample on a slide.

Information in addition to the slide may also be obtained. For example, a user may also provide other information about the location or environment where the particles or material were obtained. Additionally, other information may be included such as health symptoms, ages, a serial number linked to a location or customer, a type of sample, or the like.

The slides and other information may be received from a user, customer, technician, or other entity that has obtained and forwarded one or more samples. For example, a lab worker may receive the one or more slides and load the slides into a scanner for imaging. In one embodiment, the lab worker may scan a barcode on the slide that links the slide with other information about the slide (e.g., a customer, location, health symptoms, and sample type). The barcode may be used to automate where to look on the slide to locate the particulates from the sample. For example, the barcode may identify a manufacturer, customer, or party or entity that obtained the slide because the manufacturer, customer, or party or entity that obtained the slide may indicate where the sample is actually located. In some cases, it can be difficult to locate particulates on a slide, such as mold spores, if you don't know where the sample was placed on the slide. For example, the slide may be much larger than the actual sample so it is often efficient to only scan/image the portion of the slide where the particulates are located. Knowing the entity, customer, or slide manufacturer (or brand) may allow a scanning system to automate location and scanning of the relevant portion of the slide.

Samples may be imaged using a wide range of different imaging techniques and at a wide range of different magnifications (or zoom levels). Example scanners or imagers that may be used include a digital microscope, bright-field microscope, polarized imager, phase contrast image, fluorescence imager, scanning electron microscope, dark-field microscope, or other types of scanners/imagers. During scanning or imaging of the sample, the scanner (such as a digital microscope) may be used to scan or image the whole area where the sample is located (e.g., where any particulates or materials are located). These obtained images may be quite large in pixel count and memory size. For example, the images may be in full-color (16 bit, 24 bit, 32 bit or more) with very high resolution (pixel count and/or dots per inch). In one embodiment, the imaging/scanning process obtains not only images of the whole area, but also images at different resolutions. For example, the sample area may be divided up into a grid of smaller sized areas, which are each imaged at a high magnification and then multiple grid areas may be imaged together at a lower/wider magnification. Different magnifications may be helpful in imaging/identifying different sizes of particulates or detecting details for identifying different material types. For example, a single sample may include particles of different sizes that would be helpful to detect and identify.

After imaging, the resulting digital images may be stored or associated with a serial number identifying the location where the sample was taken, a customer that obtained the image samples, or any other information about the location, sample, type, study type, medical conditions, or the like.

The digital images may be stored and transmitted to a cloud storage or remote storage location for training, aggregation, analysis, classification, association or aggregation with other data, or the like. For example, the lab may acquire the images and upload to a file server. The file server may include a listener that detects the uploading of new images and uploads those to a remote classification system for classification, storage, reporting, and/or sharing. Related data may also be uploaded with the image for storage at a remote or cloud location. Custody tracking of the sample, digitized images, and associated data may be provided to ensure security and accuracy of the data. In one embodiment, images, customer information, health information, or the like may be associated with a common serial number or other identifier so that correlations between various data can be determined.

Data stored in the remote or cloud storage may include data, including images and related data, from a large number of different labs, customers, locations, or the like. The stored data may be accessible to a classification system that includes a classification model, neural network, or other machine learning algorithm. The classification system may classify each image (or sample associated with the image) as including a particular type of particle. For example, the classification system may analyze each image to classify or detect particles within the images. A particle may be classified as a particular type of particle, such as a particular type of tissue, crystal, cell, parasite, bacteria, mineral, pollen, or the like. For example, the classification system may generate a heat map for an image indicating which regions of the image include different types of particles.

As another example, the classification system may generate bounding boxes and then detect/classify particles in the bounding boxes. For example, the bounding boxes may indicate regions where there is likely something to be present (e.g., a mold spore) to be classified or detected. This may allow analysis or processing of only portions of the image using a neural network or algorithm to locations where particles or materials are present and ignoring regions where there are not particles. For example, large regions of an image may be blank or white space where no particles are present. Processing blank or white space regions using neural networks may be a waste of computing resources. The model or neural network used by the classification system may include a system trained based on human classified images or samples. For example, the neural network may be trained using supervised learning. In one embodiment, learning and training may be performed using unsupervised machine learning.

In one embodiment, the classification system may provide one or more images (or portions of images) of samples to users for classification. For example, previously classified or unclassified images may be provided to one or more experts for classification. The experts may provide their own classification, which may be used to either confirm or change an original classification. The machine learning algorithms, models, or neural networks may be retrained based on the updated classifications to further improve machine learning models and algorithms. In one embodiment, changes to classifications for specific particles or images may be tracked. Tracked classifications may provide additional data about the accuracy of classifications and can lead to further refinement in machine learning and classification algorithms and models.

Based on classification of particles within samples, reports may be generated for the type of study that is being performed for a location, patient, or customer. The report may be generated based on the classification of particles within images of samples, particle counts for different particle types, health conditions related to the presence or counts for specific particle types, or the like. The report may be automatically generated specific to the serial number, customer, and/or location associated with the images and the corresponding sample. In one embodiment, a report may include a report for the types of particles detected, the number of particles, likely conditions in the sampled environment or patient, recommended steps to be performed, or the like. The report may be provided as a general report for a specific particle type or may be more general to health or conditions for a sample environment.

As used herein, the term "particle" is given to mean any small unit or portion of material such as dust, mold sports, cells or groups of cells, fibers, small chunks of materials, organism(s), tissue, biological matter, minerals, or any other item or material discussed herein as being classified or detected. Additionally, the classification, detection, or identification of particles may include identifying a specific type of particle or condition of a specific particle or material. For example, cells may not only be identified as a specific cell type, but also as having or displaying a certain condition, such as a condition that corresponds to an abnormality or to cancer.

Embodiments disclosed herein may provide significant utility and benefits. For example, automated particle classification, report generation, and/or the like may significantly reduce expert time and/or errors (such as typographical errors), thereby increasing efficiency and accuracy. At least some embodiments disclosed herein enable the full classification of each particle within a whole sample. Generally, technicians do not have enough time, nor are they required to, analyze every particle or the full sample for particle type or classification. Additionally, it can take a large amount of time for a technician to perform particle analysis and classification within a sample. This time can be saved by using machine learning algorithms and/or deep neural networks for automated computer or machine learning classification. Accuracy may be increased because a greater portion of the slide (or sample) is actually analyzed and because embodiments of machine learning algorithms or models may provide greater classification accuracy for a particle type and even for a larger number of different particle types.

Embodiments disclosed herein further allow for the long-term storage and use of samples because they are stored as digitized images and stored in a central location. Machine learning algorithms may be refined based on the large corpus of data and thus improved particle identification algorithms and machine learning results may be obtained. Error in report creation may also be decreased because typographical errors by humans may be reduced or eliminated. For example, even if a generated report is modified by a human user or technician after generation, the report details may reduce the chance of filling out a report with information from an incorrect sample, customer, location, or the like. Furthermore, the tracking of the movement of the sample, digital images, associated health or location data, changes in particle classification, or the like may lead to quicker and more accurate reporting to clients. Additionally, more accurate tracking may lead to less management overhead and reduce the amount of time it takes to place a process in a final state so that a report and/or bill may be sent to a customer. Thus, a larger number of customers may be served and even better identification and reporting results may be obtained.

In some cases, distinctions between different particles, or distinctions between different classifications of the same particle type may not be detectable visually for humans.

Because existing classification methods for particles depend on human classification using the same channel as the human (e.g., visual detection/classification based on an image), existing systems and methods are unable to distinguish between particles that are indistinguishable to humans.

However, Applicants have recognized that, at least in some cases, machine learning algorithms and models, such as deep neural networks, can be trained to perform better than humans in visual classification and detection. As such, Applicants have developed, and herein disclose, systems, methods, and devices for particle classification using out-of-channel means for establishing ground truth. The non-image data may include any out-of-channel means for determining the classification for the mold. Example out-of-channel means include a DNA test, a polymerase chain reaction (PCR) test, a known source location for a sample, or a fluorescent imaging test (e.g., using a fluorescent imaging scanner). Other out-of-channel means may also be included and may include any non-image means of determining a classification. Just because a human is not able to identify a visual distinction based on an image does not mean that the image does not include features or data that can be used by a neural network other machine learning algorithm to distinguish between classifications. In one embodiment, out-of-channel means or mechanisms may include determining the classification based on an image of the same specimen at one or more different focal planes or focal depths. Because out-of-channel means may be used to reliably classify a particle, the out-of-channel means may be used as ground truth for training.

In some cases, it can be difficult for humans to classify a particle based on a single microscopy image. For example, the optics of digital microscopes often have a very small depth of field which sometimes makes it impossible to capture all of a specimen in a single focal plane. By way of example, giardia parasites may have a depth greater than the depth of field of a digital microscope so that only a portion of the giardia parasite is in focus at a single time. Often, establishing ground truth off of multiple focal planes will be more accurate than ground truth off of a single focal plane, a least for human examiners. In some cases, a trained human is unable to determine a classification based off only a single focal plane. Some of the information that would be available with a different focus depth or focal plane may have helped the user. Applicants have recognized that some of this information may be present, but in a blurred state, within different depths of field. Applicants have also recognized that another challenge in machine learning with microscopy images is that it may be difficult to guarantee what the depth of field or what focal plane will be for images of real-world samples. Furthermore, it can be difficult to acquire sufficient training data to perform machine learning, especially to distinguish between similar particles.

In light of the foregoing, Applicants have developed systems and methods for obtaining training data and for training machine learning systems. In one embodiment, method includes receiving a plurality of microscopy images of a specimen and a classification for the specimen. The plurality of microscopy images includes a first image captured at a first magnification and a second image captured at the first magnification with a different focus than the first image. For example, the images may have been captured using a different focal depth or focal plane. The method further includes training a machine learning model or algorithm using the plurality of images, wherein the first image and the second image are provided with one or more labels indicating the classification.

In one embodiment, obtaining a plurality of different images of the same specimen with different focal depths or different focal planes for the same regions of a sample or the same specimen can improve training. For example, training a deep neural network or other machine learning model or algorithm using different focal depths may lead to increased accuracy in classification of partially blurred images. In one embodiment, machine learning model or algorithm may be able to detect information within the blurred regions that help in the classification of particles. Additionally, obtaining images of specimens and samples at multiple focal depths can also increase the rate at which training data may be generated. For example, if five different focal depths are captured for each region of a sample, any particles within the regions may have five images with the same classification. Each of these images or particles and their classification may be provided during a training process to help train a machine learning model or algorithm.

A detailed description of systems and methods consistent with embodiments of the present disclosure is provided below. While several embodiments are described, it should be understood that this disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments may be practiced without some or all of these details. Moreover, for the purpose of clarity, certain technical material that is known in the related art has not been described in detail in order to avoid unnecessarily obscuring the disclosure.

FIG. 1 is a schematic block diagram illustrating a system and environment for obtaining, classifying or detecting, and/or sharing digitized images of particle or material samples, according to one embodiment. The system 100 includes an imaging system 102 and a particulate classification system 104. In one embodiment, samples may be obtained from a location or environment by a technician or professional 106. The technician or professional 106 may include a person that has been trained or licensed to obtain samples. The samples may include samples from any source, location, or environment disclosed herein. For example, an air sample, tape sample, surface sample, or other sample that may capture mold spores may be obtained. As further examples, samples related to health or medical services may be obtained from a patient or animal by a medical professional or veterinarian. Samples from any of the locations, environments, or materials discussed herein may be obtained by other professionals, lay persons, or customers in any manner discussed herein or known in respective industries or fields. Example methods to obtain samples include obtaining a portion of whatever material is to be imaged or processed such as bodily fluids or tissues, plant matter, soil, lake or other water sources, dust, surface samples (e.g., tape samples or swabs). In one embodiment, the sample may be stored in a container such as a vial, bag, bottle, or other container.

A technician or professional 106 may also obtain any other information about the sample including a source of the sample, a location, a sample type, a study or testing purpose, a customer or patient identifier, a date, temperature or weather conditions, or any other information about or related to the sample. This information may be logged by the technician or professional 106 into a computer system or other database and associated with the sample, such as by associating the sample, customer, or patient identifier. This information may be provided to and/or stored in the classification system 104 and/or a data store 112. The technician or professional 106 may obtain the sample in response to a request or approval by a customer or patient. The customer or patient may agree that the data will be used for research/big data purposes.

After the samples are obtained, the samples may be applied to a slide 108 for preservation, shipping, standardization, or the like. The slide 108 may be provided to a lab or an imaging system 102 for imaging or digitization of the sample. When the sample is received by the lab or organization that is to digitize the sample, the lab logs the samples into the lab's software to a customer's job. The customer at this point may be the original customer, patient, or the inspecting organization. A customer account may be created in the labs software and/or in software for the classification system 104. The lab may create a job for the sample or customer in the lab's or particulate classification system's software. The software may link the sample to the customer and job based on a sample serial number.

If a lab or customer does not have an account with the classification system 104, an account may be created and any necessary software may be installed on a lab computer. For example, a user account with information about the lab or customer may be generated and authentication details may be provided for using the account. As another example, the classification system 104 or another party may, at times, need to uniquely identify the scanner or lab from which the digital samples will be provided.

When the slides are received and a job is created in a corresponding account, the lab may prepare the slide for digitization. For example, the slide may be stained, covered with a cover slip, or the like, as necessary. The slides may be loaded into the scanner (such as a digital microscope or other imaging device discussed herein). Depending on the type of sample or manufacture for the sample media, the slide may be loaded such that a pre-selected area will be scanned. For example, samples or slides for different sources (such as customers or manufacturers) may position the sample consistently at a specific location in the slide. This can make it easier for a technician or the imaging system 102 to determine what portion of the slide to image. For example, the particulates or materials of a sample can be very small and may not be visible to the naked eye. Thus, it can be difficult for a user to see what portion of the slide needs to be imaged. If the sample is a tape sample or other sample that may not have a consistent location, a user may need to select the sample size and set the focus points manually. The scanner then images the sample and automatically loads the sample images up to the classification system 104 over a network 110. In one embodiment, as discussed herein a plurality of images capturing the same portion of the sample at different focal depths or in different focal planes may be captured. For example, a same particle or material in the sample may be imaged a plurality of times with each image having a different focal depth or focal plane. The sample images may be stored within or associated to the account of a lab or customer account and/or may be associated with any other data gathered about or in relation to the sample.

The classification system 104 may receive images from the imaging system 102 and/or images from a large number of imaging systems 102 for the same or different labs. In one embodiment, the images may be stored in a data store 112. In one embodiment, once the images are processed and/or stored, a notification may indicate that there are new samples ready to be processed.

In one embodiment, samples, or particles within samples, may be automatically classified by a deep neural network or other machine learning classification algorithm of the classification system 104. For example, images may be fed to a neural network classifier, which outputs an indication of what type of particle(s) is/are in the image. In one embodiment, a scaled or raw subsection of an image having pixel dimensions required by the neural network or classification algorithm may be provided to the neural network or classification algorithm. In one embodiment, the same image or section of image may be processed by a plurality of neural networks to determine what types of particles are in the image. The classification algorithm or network may indicate a probability that the image includes particles of a particular type.

The classification system 104 may process all images correlating to a sample imaged by the imaging system 102. For example, the classification system 104 may use a machine learning algorithm or model on all images and/or all portions of the image to obtain an extremely accurate classification of most or all particles within the images. This provides considerable accuracy and completeness because human technicians generally don't have the time or ability to analyze all portions of a sample where particulates are located. With machine learning processing of each image corresponding to a sample, an extremely accurate particle count, particle type count, and the like may be achieved.

In one embodiment, samples, or particles within samples, may be classified or reviewed for classification by a human worker. For example, as a neural network or machine learning algorithm is being trained, human review or initial classification of a particle may be required. When samples are ready to review, samples may be grabbed and worked on by a technician working on a local or remote computer 114. After selecting the sample from a list needing attention, the technician is presented with the cut out particulate images. For example, the images may be cropped in order to provide an image where the particle or material is large enough to be viewed or observed by the user. The technician may be able to provide an initial classification, or review and re-classify or modify a classification given by a neural network, which may then be fed back into the machine learning as new samples for further training of a model or network.

In one embodiment, images may be shared by a technician with a colleague by clicking on a share option. The image may be sent by the classification system 104 via email to a registered user with a link that takes them to the image. During the classification stage, any notes from the technician could be added to an image or section of the image. If the context of the image within the sample is needed for the report, the user may indicate the larger area surrounding the sub section to be saved to notes to be included as part of the report or for later use. The technician may provide an indication that gives their approval that the sample has been reviewed and that a particle or material is correctly classified. In one embodiment, a technician could repeat this process until all of the slides/images pertaining to this particular customer job have been reviewed and approved.

The classification system 104 may include a reporting component for generating reports. The classification system 104 may automatically generate a report based on the identification of particles in an image of the slide and/or a report, investigation, or examination type corresponding to the slide or sample. The report may include information about particle types, particle counts, health impacts, instructions to check for certain health symptoms, potential remedies to reduce or increase particulate counts, or the like. In one embodiment, a report generation process can be started by selecting a button or menu on a list of jobs (e.g., customer jobs for sample processing). The classification system 104 may generate a report template that shows the types of materials and particulates found, a customer or serial number, account information, health symptoms, or any other information related to a specific report or examination type. For example, the template report may include health concerns if these particulates are found and potential investigation/remediation steps.

In one embodiment, the generated report or report template may be provided to a technician for review, confirmation, and/or transmission to a client. The technician or other report writer may be able to provide input to modify the report, add pictures to the report from a list of saved pictures for that customer, save and sign a report, and/or trigger sending of the report (such as via email in a .pdf file) a company or customer that requested the report. Once the report is sent, lab management software of the imaging system 102 or classification system 104 is notified that the report has been delivered.

In one embodiment, the classification system 104 may export information for external report generation. For example, the classification system 104 may be able export information in a format or condition that another software program can generate a report based on the information. In one embodiment, if a user prefers not to use the built-in report writer, the user should be able to export the data and pictures to lab management software of the user's choice. The text information may be exported in a .csv file or .xml file, in one embodiment. In one embodiment, the images may be exported to a unique directory or file for access by the external report generation program or user.

Upon classification and/or reporting, a specific job may be marked as complete. In one embodiment, the information may be archived. For example, 6 months after a completion date for the job, the customer job may go to an archived state for 5, 10, 20, or more years. In one embodiment, the data may be kept indefinitely for research use or as test/research data for improving a machine learning or deep learning algorithm or model. In one embodiment, archived information may be searched based on any relevant information, such as location, barcode of slide, or any other information associated with an image, slide, customer, or job.

In embodiments where the classification system 104 is accessible from a remote location, such as via the Internet, significantly improved machine learning and classification may be possible. For example, in machine learning applications the cost of obtaining data and obtaining annotations of the data (e.g., an indication of a classification) can be extremely time consuming and/or difficult to obtain. The remotely accessible classification system 104 may train algorithms based on all images of the same type of material and thus those accessing the classification system 104 may obtain the benefits of large datasets that a party may not otherwise be able to obtain. For example, some types of examinations may not occur frequently enough within a given organization to obtain enough data to train a machine learning model or neural network. By sharing data among different locations and even organizations, even examinations that occur infrequently for each organization may occur frequently enough in combination to adequately train machine learning models or networks.

Figure 2:
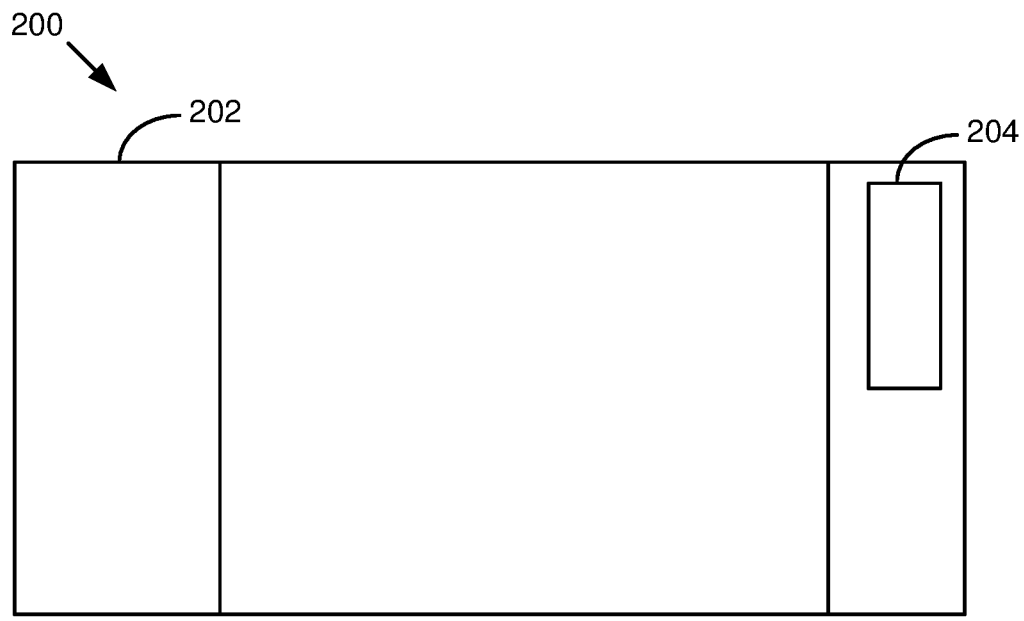
FIG. 2 illustrates a schematic diagram of a sample slide in accordance with the teachings and principles of the disclosure.

FIG. 2 is a schematic diagram illustrating an example sample slide 200, according to one embodiment. The slide 200 includes a region 202 where the sample is located. For example, a tape sample, air sample, liquid sample, smear, or other particles from a sample may be located only in the region 202 so that it is not necessary to image any other portions of the slide 200. The slide 200 also includes a label 204 which may include a barcode, serial number, brand, or other identifier. The identifier may be used to determine that the sample is located within the region 202. For example, the imaging system 102 or technician may know or determine where to position and/or scan the slide 200 based on the label 204.

Figure 3:
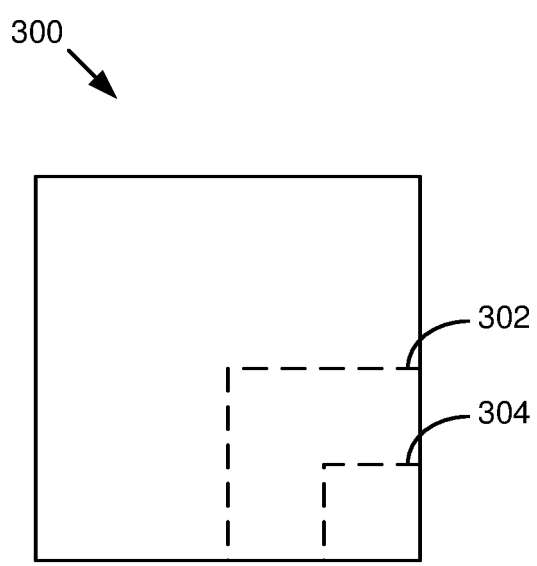
FIG. 3 illustrates is a schematic diagram illustrating a section and subsections of a digitized image obtained of a sample in accordance with the teachings and principles of the disclosure.

FIG. 3 is a schematic diagram illustrating a section 300 and subsections 302, 304 of a digitized image obtained of a sample slide, according to one embodiment. The section 300 may include a portion of the region 202 of the slide 200, subsection 302 includes a quarter of the section 300 and subsection 304 includes a sixteenth of section 300. In one embodiment, full resolution images of the section 300 may be obtained at different magnifications. A first magnification image may be obtained at a wider zoom to capture the whole section 300. Four images at a second magnification covering a region the size of subsection 302 may be obtained of the section 300. Sixteen images at a third magnification covering a region the size of subsection 304 may be obtained of the section 300. Thus, a plurality of images of the same region, at different magnifications may be obtained. The different magnifications may be useful in identifying or classifying or detecting different size particles. For example, mold spores are generally smaller than insects and thus may require a higher magnification image to accurately detect or classify. Other magnifications may be used to obtain desired levels of detail based on the specific types of particles or materials that are to be detected.

In one embodiment, a plurality of focal depths are obtained for each section 300 or subsection 302, 304 of a sample. For example, at each location, the digital microscope may capture an image at a first focal depth, a second focal depth, a third focal depth, and so forth until a desired number of focal depths are obtained. The focal depth used may be based on the expected thickness of the sample. For example, samples that are expected to have larger focal depths may have a first focal depth that provides a focal plane at a distance from a surface of a slide. Increments in the focal depth may occur for each image for that specific region or location of the sample. After imaging of a sample, a plurality of magnifications, as well as a plurality of focal depths for each magnification, may be stored and associated with the sample.

Figure 4:
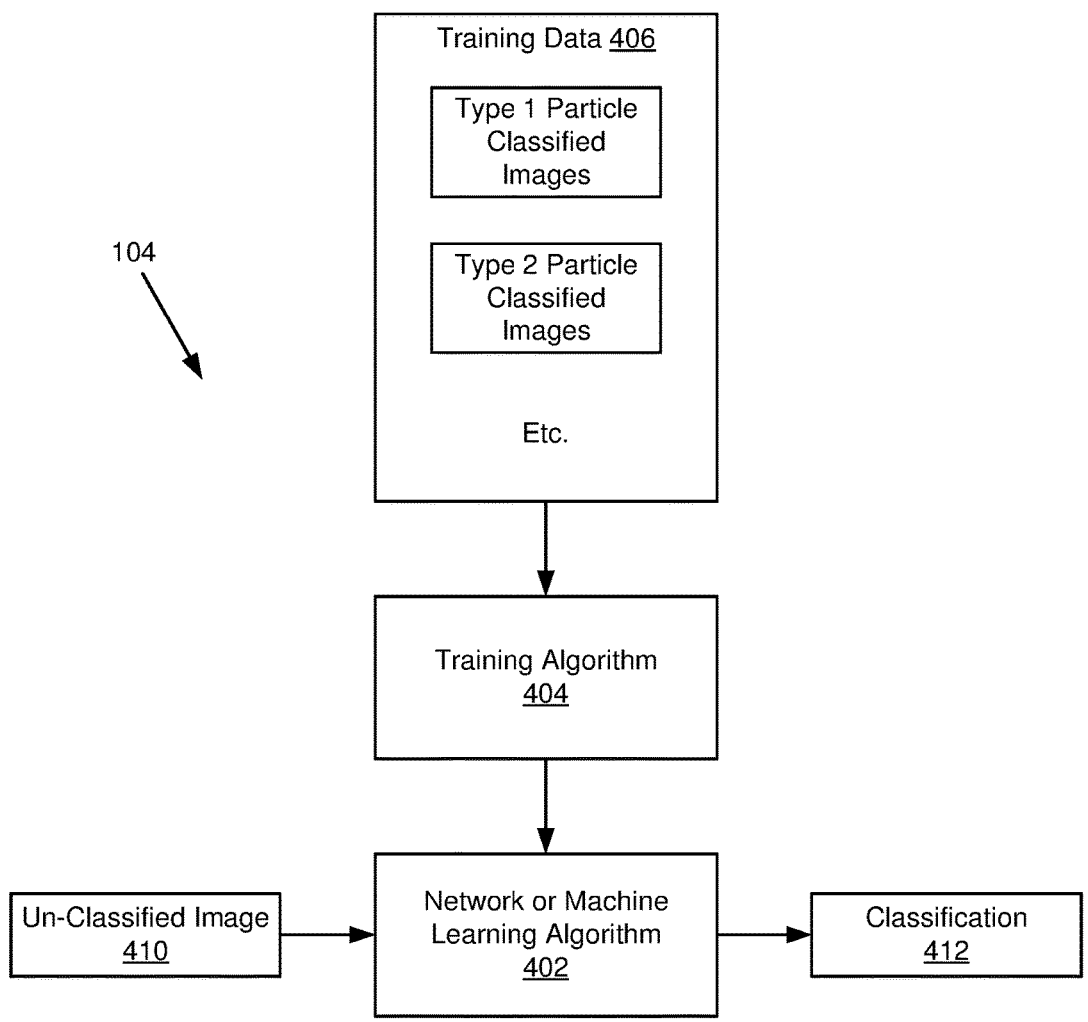
FIG. 4 is a schematic block diagram illustrating operation of a classification system in accordance with the teachings and principles of the disclosure.

FIG. 4 is a schematic block diagram illustrating operation of a classification system 104, according to one embodiment. In one embodiment, a network or machine learning algorithm 402 (which may also be referred to as a hypothesis), may be trained and used for identifying and classifying or detecting particles in an image. The network or machine learning algorithm 402 may include a neural network, such as a deep convolution neural network, or other machine learning model or algorithm for classifying or identifying particle types.

In one embodiment, the network or machine learning algorithm 402 is trained using a training algorithm 404 based on training data 406. The training data 406 may include images of particles or materials and their designated classifications. For example, the training data may include images classified as including particles or materials of a first type and images classified as including particles or materials of a second type. The types of the particles or materials may vary significantly based on the type of examination or report that is needed. Training data for any other type of particle, material type, or the like may be used. For example, training data for any particles that are to be identified by the machine learning algorithm 402 may be provided. Using the training data, the training algorithm 404 may train the machine learning algorithm 402. For example, the training algorithm 404 may use any type or combination of supervised or unsupervised machine learning algorithms.

In one embodiment, the training data 406 may include a plurality of images for the same specimen (e.g., a particle, tissue, cell, or any other object or material captured in a sample). The plurality of images of the same specimen may be at different magnifications and at different focal depths. For example, each magnification may include a plurality of focal depths to provide full coverage of the depth of a sample. For example, the depth of fields for each image may overlap so that each focal depth is covered within the plurality of images at that magnification. Although the images of the specimen may have different focal depths, the images may have a corresponding identical label (e.g., ground truth classification of the specimen) because it is the same specimen in each image.

Once the network or machine learning algorithm 402 is trained, the network or machine learning algorithm 402 may be used to identify or predict the type of particle within an image. For example, an unclassified image 410 (or previously classified image with the classification information removed) is provided to the network or machine learning algorithm 402 and the network or machine learning algorithm 402 outputs a classification 412. The classification 412 may indicate a yes or no for the presence of a specific type of particle. For example, the network or machine learning algorithm 402 may be targeted to detecting whether a specific type of mold, bacteria, particle, or material is present in the un-classified image 410. Alternatively, the classification 412 may indicate one of many types that may be detected by the network or machine learning algorithm 402. For example, the network or machine learning algorithm 402 may provide a classification that indicates which type of particle is present in the un-classified image 410. During training, the classification 412 may be compared to a human classification or an out-of-channel classification to determine how accurate the network or machine learning algorithm 402 is. If the classification 412 is incorrect, the un-classified image 410 may be assigned a classification from a human and used as training data 406 to further improve the network or machine learning algorithm 402.

In one embodiment, both offline and online training of the network or machine learning algorithm 402 may be performed. For example, after an initial number of rounds of training, an initial accuracy level may be achieved. The network or machine learning algorithm 402 may then be used to assist in classification with close review by human workers. As additional data comes in the data may be classified by the network or machine learning algorithm 402, reviewed by a human, and then added to a body of training data for use in further refining training of the network or machine learning algorithm 402. Thus, the more the network or machine learning algorithm 402 is used, the better accuracy it may achieve. As the accuracy is improved, less and less oversight of human workers may be needed.

Figure 5:
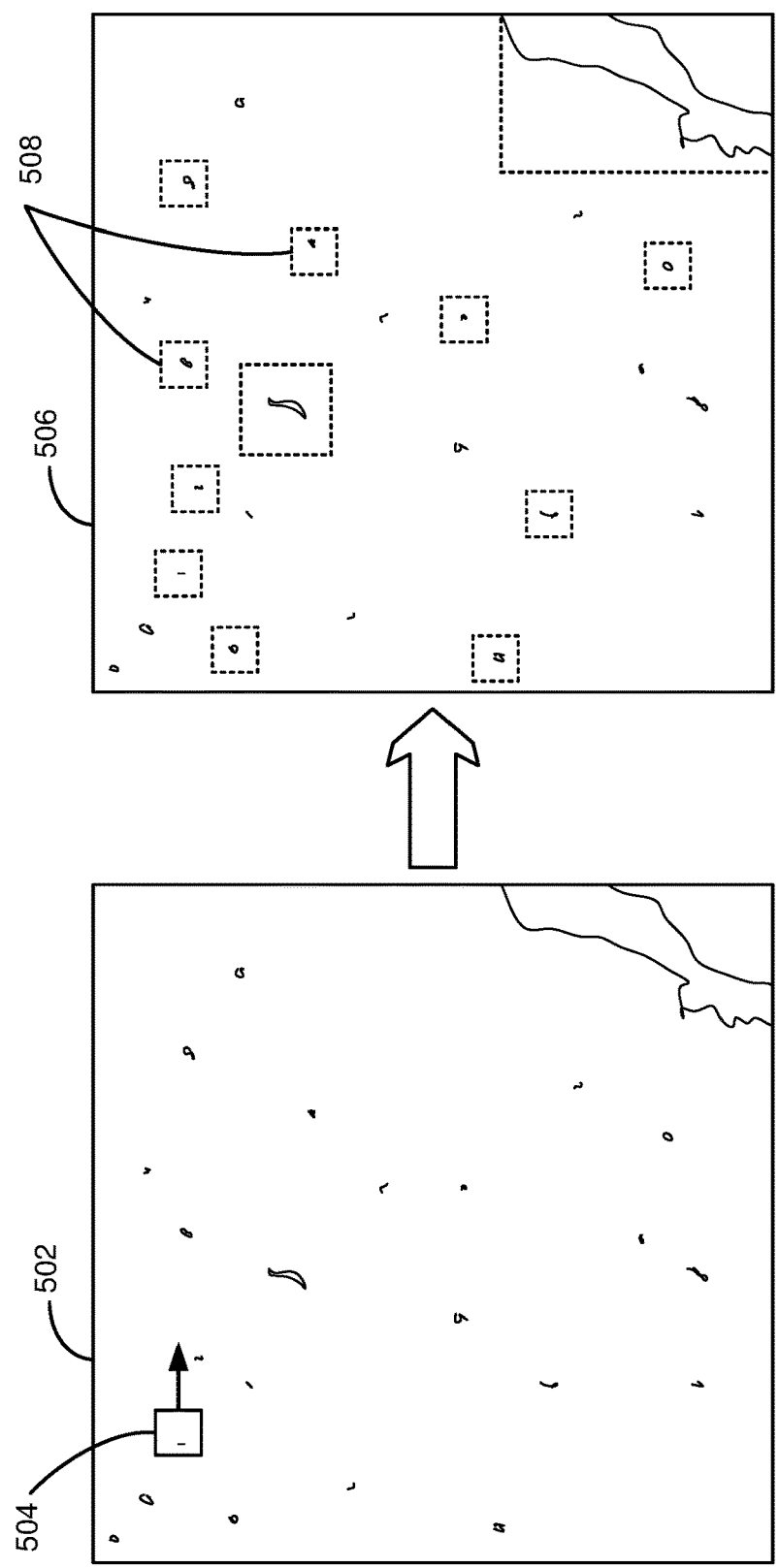
FIG. 5 graphically illustrates a method for classifying or detecting particles in an image to generate a heat map or bounding boxes in accordance with the teachings and principles of the disclosure.

FIG. 5 provides a graphical representation of classifying or detecting particles in an image 502 using a sliding window 504 to classify sub-portions of the image and generate a heat map 506. In one embodiment, the classification system 104 may generate the heat map 506 by analyzing a portion of the image 502 within a current position of the window 504 using the network or machine learning algorithm 402 to classify or detect particles within the window 504. For example, the window 504 may start at the upper left corner of the image 502 and the network or machine learning algorithm 402 may output a classification for that region. The classification may include an indication of the particle type, an indication that there is a particle, and/or an indication that there is no particle at the position (e.g., blank white space).

After classification at that position, the window 504 may be moved over to the right. The new position may immediately border or partially overlap with the previous position of the window 504. The section of the image 502 within the window 504 at the new location may be analyzed. The classifications may be tracked for each position as the process is iterated to move the window 504 across and down (or in any other systematic or random pattern) so that every section of the image 502 has been within the window 504 at least once during the process. Based on the classification for the window at each position, a heat map 506 may be output. The heat map 506 includes a plurality of regions 508 (designated by regions surrounded by dotted lines) that indicate regions where certain types of particles have been detected. In one embodiment, each region 508 may have a different classification, as determined by the network or machine learning algorithm 402. For example, the heat map 506 may indicate that a first type of particle is located at a first location and that a second type of particle is located at a second location. In one embodiment, the section of the image 502 may be analyzed using an additional sliding window of a different size. For example, larger sliding windows may be used to detect particles and/or particle types of different sizes.

Based on the heat map 506, the sample may be classified has having the types of particles identified during the classification process. In one embodiment, cropped images including the regions 508 may be generated and stored as examples of specific types of particles. In one embodiment, the cropped images may be reviewed by a human reviewer or expert for quality control or may be used on a report to illustrate the particles that are present in an image or sample.

In one embodiment, instead of generating a heat map, the classification system 104 may generate bounding boxes and then execute classification/detection algorithms on the content of the bounding boxes. For example, the classification system 104 may use a sliding window to detect regions where particles are present to generate a plurality of bounding boxes. Since some of the bounding boxes may be duplicates or overlap, the classification system 104 may remove or combine duplicate/overlapping boundary boxes to form a subset or new set of bounding boxes. Those bounding boxes (or the pixels in those bounding boxes) may be fed separately into neural networks for processing and for identification/detection of particles.

Similarly, the methods and steps illustrated in relation to FIG. 5 may also be used on training data to extract particles for training or determining ground truth during a training step. For example, the methods and steps may be used on the plurality of images having different focal depths of the same specimen may each be processed to identify, extract, or detect particles for classification or training.

Figure 6:
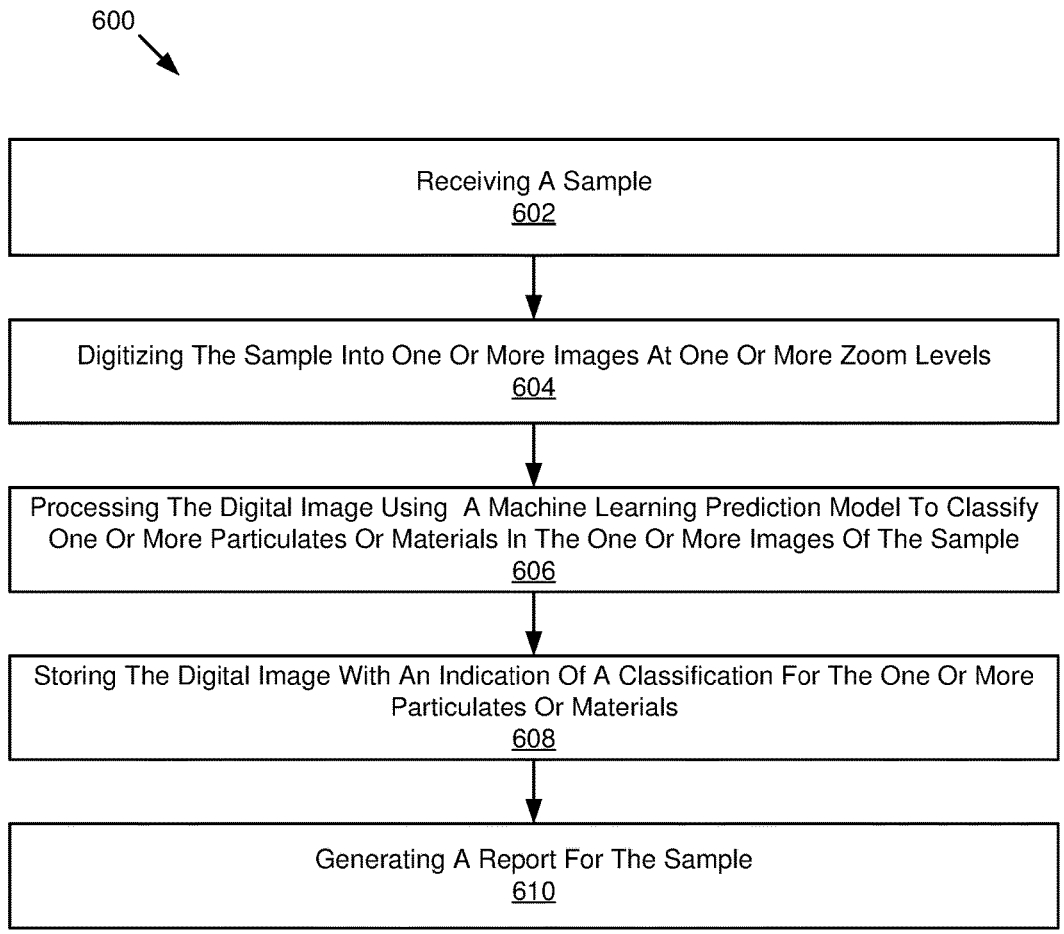
FIG. 6 is a schematic flow chart diagram illustrating a method for classifying or detecting particles or materials in a sample in accordance with the teachings and principles of the disclosure.

Referring now to FIG. 6, a schematic flow chart diagram of a method 600 for classifying a sample is illustrated. The method 600 may be performed by a classification system, such as the classification system 104 of FIG. 1.

The method 600 begins and a lab receives 602 a sample. An imaging system 102 digitizes 604 the sample into one or more images at one or more magnifications. A classification system processes 606 the digital image using a machine learning prediction model to classify or detect one or more particulates or materials of the sample. The classification system stores 608 the digital image with an indication of a classification for the one or more particulates or materials. A report component generates 610 a report for the sample based on the classification for the one or more particulates or materials.

As discussed previously, because many digital microscopes include very narrow depths of field, it is not uncommon for portions of an image to be out of focus, especially if large particles are present. In some situations, this may make it difficult for a human to classify a specimen based on a single microscopy image where some portions are blurred or out of focus. However, there may be sufficient information for a machine learning algorithm or model (such as a deep neural network) to determine a classification.

In one embodiment, by obtaining a plurality of depths of fields for each training sample, and using each of those images to train the same machine learning algorithm or model (such as a deep neural network), the machine learning algorithm or model may be able to distinguish and classify particles based even on partially blurred images. In one embodiment, each image may be provided, one at a time, with a label for the classification of the specimen in the image to the neural network during a training procedure. Once trained, the trained neural network (or other machine learning algorithm or model) may be used to classify images of particles with improved performance or accuracy.

Figure 7:
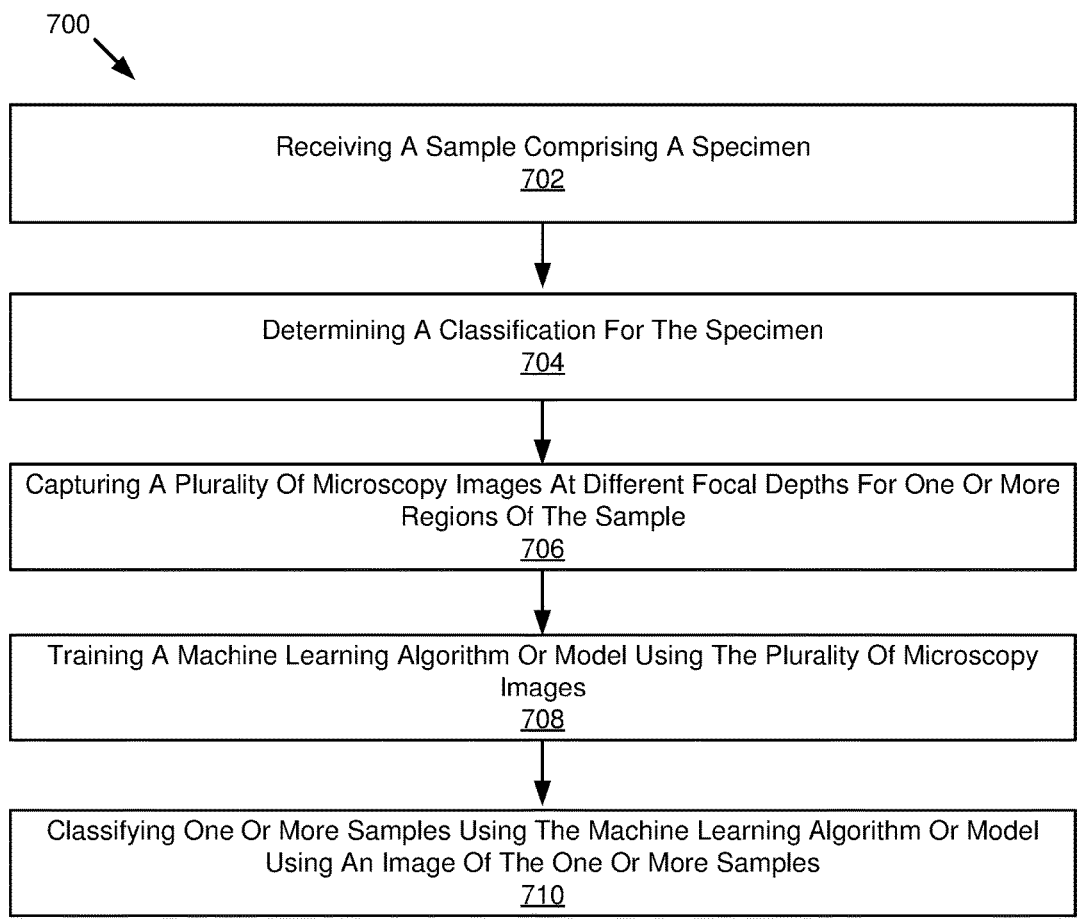
FIG. 7 is a schematic flow chart diagram illustrating a method for training a machine learning algorithm or model and classifying or detecting particles or materials in a sample in accordance with the teachings and principles of the disclosure.

FIG. 7 is a schematic flow chart diagram illustrating a method 700 for training a neural network or machine learning algorithm or model, according to one embodiment. The method 700 may be performed, at least in-part, by a classification system or other system, such as the classification system 104 system 100 of FIG. 1. The method 700 may include any combination of the displayed steps, sub-methods, functionality or the like, without limitation.

The method 700 begins and a sample is received 702. The sample may be a physical sample, such as a mold sample gathered as part of an air, tape, or other sample. The sample may include a sample that has been applied to a slide for imaging. The sample includes one or more specimens for which it is desirable to train a machine learning algorithm or model to classify. The method 700 includes determining 704 a classification for the specimen in the sample. The classification may be determined 704 through a separate examination, based on one or more images of the specimen, or by using a separate test. For example, one or more tests discussed herein, such as a DNA test, a PCR test, a fluorescence test, or any other test or examination may be used to determine the classification for the sample. In one embodiment, the classification for the specimen is determined 704 based on any out-of-channel means, such as by any data not included in a specific image of the sample or specimen. For example, the data may be derived from different images, from other tests, from a source location of the sample, or any other data.

The method 700 includes capturing 706 a plurality of microscopy images of the sample. For example, an imaging system 102 may capture 706 multiple images of each region of a sample, where the images for the same region include differing focal depths. Thus, a specimen with in the sample may have corresponding images that are captured at different focal depths but a same or similar magnification.

The method 700 includes training 708 a neural network (or other machine learning model or algorithm) using the plurality of microscopy images having different focal depths for the same magnification and same specimen. The neural network may be trained 708 by providing each image of the specimen separately with the corresponding classification for the specimen. Thus, the neural network may be trained to detect the specimen for images having varying focal depths or focal planes. The classification system 104 may train 708 a deep neural network or other machine learning algorithm or model using the images, the known classifications, and any known training algorithms. A label for each image may be provided, even though some images may be of the same specimen and may have the same classification. Because the same specimen has multiple images each having different focal depths, the machine learning model or algorithm may have improved ability to classify particles even if part of the particle is blurred or not within focus.

The method 700 includes classifying 710 one or more samples or specimens using the trained neural network or machine learning algorithm or model. For example, after training 708, the classification system 104 may provide one or more unclassified microscopy images to a trained neural network or machine learning algorithm or model for classification. The algorithm or model may determine a classification based on the input. In one embodiment, a deep neural network that has been trained using a plurality of images of the same specimen, but having different focal depths, produces an output classifying one or more particles or other materials.

In one embodiment, the method 700 may be used to achieve high accuracy classifications for specimens even when portions of the specimen are not in focus. The method 700 may be used to train models or algorithms and classify specimens based on partially blurry images and/or with an accuracy exceeding that of trained human professionals.

Figure 8:
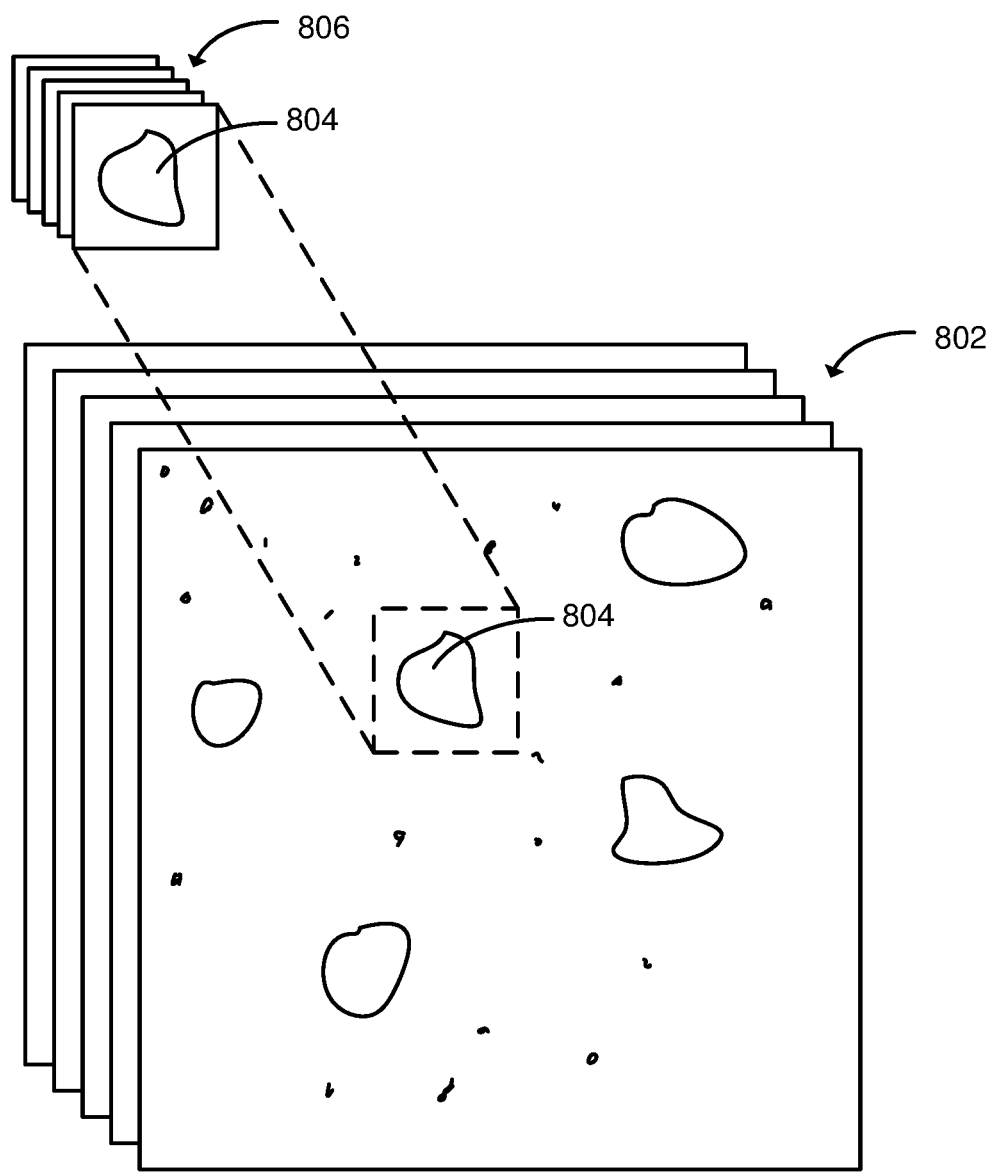
FIG. 8 is a schematic diagram illustrating a specimen within images having different focal depths in accordance with the teachings and principles of the disclosure.

FIG. 8 is a schematic diagram illustrating multiple images 802 of a region of a sample comprising a specimen particle 804. The images 802 may be portions of images captured by an imaging system 103. Each of the images 802 may have been captured with a different focal depth or focal plane so that different portions of the specimen particle 804 are in focus or out-of-focus in each image. Subsections 806 of the images 802 each containing the specimen 804 may be extracted as training input for a neural network. For example, the subsections may have an aspect ratio and/or pixel count that matches a deep neural network that will be trained for detection of particles. The subsections 806 may include different data about the specimen 804 because different portions of the specimen 804 may be in focus or blurry. The subsections 806, along with a label indicating the classification of the specimen 804, may be provided to a training algorithm for training the neural network or other model.

Figure 9:
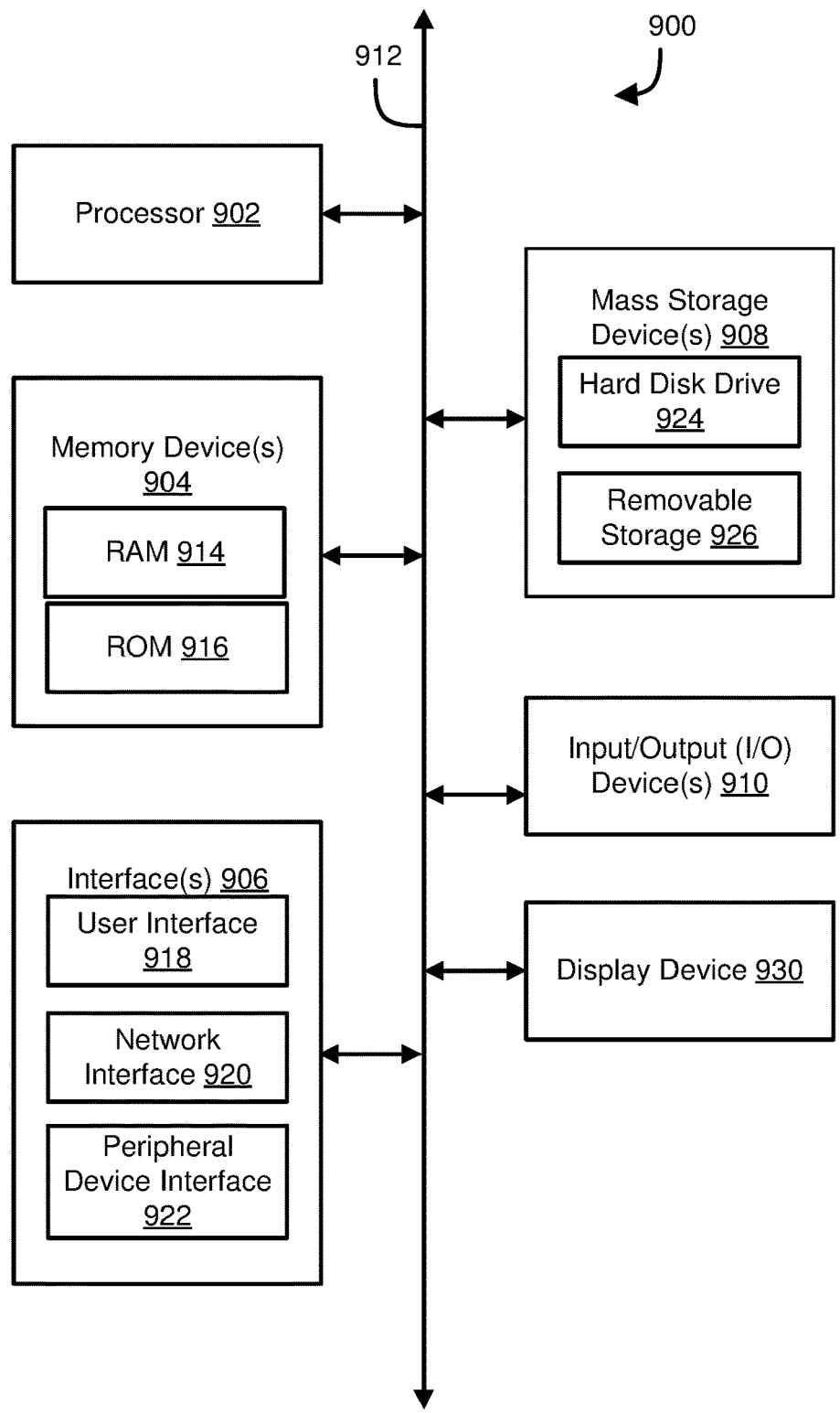
FIG. 9 illustrates a block diagram of an example computing device in accordance with the teachings and principles of the disclosure.

Referring now to FIG. 9, a block diagram of an example computing device 900 is illustrated. Computing device 900 may be used to perform various procedures, such as those discussed herein. Computing device 900 can function as a server, a client, classification system 104, any other system or computing entity. Computing device 900 can perform various monitoring functions as discussed herein, and can execute one or more application programs, such as the application programs described herein. Computing device 900 can be any of a wide variety of computing devices, such as a desktop computer, a notebook computer, a server computer, a handheld computer, tablet computer and the like.

Computing device 900 includes one or more processor(s) 902, one or more memory device(s) 904, one or more interface(s) 906, one or more mass storage device(s) 908, one or more Input/Output (I/O) device(s) 910, and a display device 930 all of which are coupled to a bus 912. Processor(s) 902 include one or more processors or controllers that execute instructions stored in memory device(s) 904 and/or mass storage device(s) 908. Processor(s) 902 may also include various types of computer-readable media, such as cache memory.

Memory device(s) 904 include various computer-readable media, such as volatile memory (e.g., random access memory (RAM) 914) and/or nonvolatile memory (e.g., read-only memory (ROM) 916). Memory device(s) 904 may also include rewritable ROM, such as Flash memory.

Mass storage device(s) 908 include various computer readable media, such as magnetic tapes, magnetic disks, optical disks, solid-state memory (e.g., Flash memory), and so forth. As shown in FIG. 9, a particular mass storage device is a hard disk drive 924. Various drives may also be included in mass storage device(s) 908 to enable reading from and/or writing to the various computer readable media. Mass storage device(s) 908 include removable media 926 and/or non-removable media.

I/O device(s) 910 include various devices that allow data and/or other information to be input to or retrieved from computing device 900. Example I/O device(s) 910 include cursor control devices, keyboards, keypads, microphones, monitors or other display devices, speakers, printers, network interface cards, modems, and the like.

Display device 930 includes any type of device capable of displaying information to one or more users of computing device 900. Examples of display device 930 include a monitor, display terminal, video projection device, and the like.

Interface(s) 906 include various interfaces that allow computing device 900 to interact with other systems, devices, or computing environments. Example interface(s) 906 may include any number of different network interfaces 920, such as interfaces to local area networks (LANs), wide area networks (WANs), wireless networks, and the Internet. Other interface(s) include user interface 918 and peripheral device interface 922. The interface(s) 906 may also include one or more user interface elements 918. The interface(s) 906 may also include one or more peripheral interfaces such as interfaces for printers, pointing devices (mice, track pad, or any suitable user interface now known to those of ordinary skill in the field, or later discovered), keyboards, and the like.

Bus 912 allows processor(s) 902, memory device(s) 904, interface(s) 906, mass storage device(s) 908, and I/O device(s) 910 to communicate with one another, as well as other devices or components coupled to bus 912. Bus 912 represents one or more of several types of bus structures, such as a system bus, PCI bus, IEEE bus, USB bus, and so forth.

For purposes of illustration, programs and other executable program components are shown herein as discrete blocks, although it is understood that such programs and components may reside at various times in different storage components of computing device 900, and are executed by processor(s) 902. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

The embodiments of systems, methods, and devices discussed herein may be applied to a wide range of sample types for detection of various particles, materials, or the like. The following paragraphs describe different types of samples which may be imaged and identified using methods, systems, or devices disclosed herein.

Tissue

In one embodiment, training, classification, and identification of particles or materials within tissue may be performed. Tissue samples may be obtained from biopsies, tissue scraping, brushing, liquid removal/withdrawal, or using any other tissue sampling or biopsy methods. Tissues samples may include human tissue samples or animal tissue samples. The tissue samples may be applied to a slide for imaging, or may be imaged in any other manner for a respective sampling or biopsy method.

Once images of the tissue sample are obtained, the images may be provided to a classification system 104. The classification system 104 may use one or more neural networks for classifying or detecting particles or materials in the images. For example, the classification system 104 may include neural networks that have been trained to identify particles or materials that may be present in a tissue sample from a specific region or location of a body or organ. In one embodiment, the neural networks may include neural networks configured to identify cells, particles, or materials that indicate the presence of a specific type of cancer. For example, a first neural network may identify cells corresponding to a specific type of cancer and a second neural network may identify other molecules or cells corresponding to the same or different type of cancer. The types of particles searched for, and thus, the neural networks used for classification, may depend on a specific type of examination. For example, the images may be provided to the classification system 104 with an indication that an examination is to be performed to detect a cancerous or benign nature of the tissue.

The classification system 104 may output an indication of classifications for particles within the images in the form of a heat map, table, or the like. For example, the indication of classification or identification may correspond to a specific region of an image, bounding box, or other location within the digitized images. Based on the output, a report may be generated indicating the presence of particular particle types and their number, a diagnoses for a medical condition (e.g., such as cancer or other disease), recommended medical procedures or treatment, or the like. The report may be provided to a medical professional or patient for review.

Bone and Bone Marrow

In one embodiment, identification of particles or materials within bone samples may be performed. Bone samples may include bone matter such as bone, bone marrow, or the like from humans or any other animal. For example, bone samples from pets, wildlife, farm animals, or other animals may be analyzed for health, bone density, or disease indicators. The bone samples may be applied to a slide for imaging, or may be imaged in any other manner for a respective sampling method. Once images of the bone sample are obtained, the images may be provided to a classification system 104.

The classification system 104 may use one or more neural networks for classifying or detecting particles or materials in the images. For example, the classification system 104 may include neural networks that have been trained to identify particles or materials that may be present in a bone sample from a human or other specific animal type. In one embodiment, the neural networks may include neural networks configured to identify blood cells such as red blood cells or white blood cells. In one embodiment, the neural networks may include neural networks configured to classify the bone as having a specific bone density. For example, the neural networks may be trained to categorize a particle in the bone sample as corresponding to a bone density above or below a specific bone density threshold. In one embodiment, the bone samples may be processed using a plurality of neural networks. For example, a first neural network may identify the presence of red blood cells and/or white blood cells and a second neural network may determine a bone density for the particles in an image. The types of particles searched for, and thus the neural networks used for classification, may depend on a specific type of examination. For example, the images may be provided to the classification system 104 with an indication that an examination is to be performed to detect particles or density of the bone sample that indicate that the source patient or animal may have a specific medical condition or disease.

The classification system 104 may output an indication of classifications for particles within the images of the bone sample in the form of a heat map, table, or the like. For example, the indication of classification or identification may correspond to a specific region of an image, bounding box, or other location within the digitized images. Based on the output, a report may be generated indicating the presence of particular particle types and their count, a diagnosis for a medical condition, recommended medical procedures or treatment, or the like. The report may be provided to a medical professional or patient for review.

Fecal

In one embodiment, samples and identification of particles or materials within fecal matter are performed. Fecal samples may include fecal matter from humans or any other animal. For example, fecal matter from pets, wildlife, farm animals, or other animals may be analyzed for health or disease indicators. The fecal samples may be applied to a slide for imaging, or may be imaged in any other manner for a respective sampling method. Once images of the fecal sample are obtained, the images may be provided to a classification system 104.

The classification system 104 may use one or more neural networks for classifying or detecting particles or materials in the images. For example, the classification system 104 may include neural networks that have been trained to identify particles or materials that may be present in a fecal sample from a human or other specific animal type. In one embodiment, the neural networks may include neural networks configured to identify one or more different types of parasites. In one embodiment, the neural networks may include neural networks configured to identify blood or blood particulates. In one embodiment, the neural networks may include neural networks configured to identify ovum (egg cells) in the fecal matter. For example, a first neural network may identify the presence of blood, a second neural network may identify the presence of ovum, and a third neural network may identify one or more types of parasites. The types of particles searched for, and thus, the neural networks used for classification, may depend on a specific type of examination. For example, the images may be provided to the classification system 104 with an indication that an examination is to be performed to detect particles in the fecal sample that indicate that the source patient or animal may have a specific medical condition or disease.

The classification system 104 may output an indication of classifications for particles within the images in the form of a heat map, table, or the like. For example, the indication of classification or identification may correspond to a specific region of an image, bounding box, or other location within the digitized images. Based on the output, a report may be generated indicating the presence of particular particle types and their count, a diagnosis for a medical condition, recommended medical procedures or treatment, or the like. The report may be provided to a medical professional or patient for review.

Blood

In one embodiment, identification of particles or materials within blood samples may be performed. Blood samples may include blood samples drawn from humans or any other animal. For example, blood samples from pets, wildlife, farm animals, or other animals may be analyzed for health or disease indicators. The blood samples may be applied to a slide for imaging, or may be imaged in any other manner for a respective sampling method. Once images of the blood sample are obtained, the images may be provided to a classification system 104.

The classification system 104 may use one or more neural networks for classifying or detecting particles or materials in the images. For example, the classification system 104 may include neural networks that have been trained to identify particles or materials that may be present in a blood sample from a human or specific animal type. In one embodiment, the neural networks may include neural networks configured to identify blood cells such as red blood cells or white blood cells. In one embodiment, the neural networks may include neural networks configured to classify or detect blood cells as having abnormal shapes, such as sickle cells. For example, the neural networks may be trained to categorize a particle in the blood sample as a sickle cell or normal red blood cell. In one embodiment, the blood samples may be processed using a plurality of neural networks. For example, a first neural network may identify the presence of red blood cells, a second neural network may identify the presence of white blood cells, and a third neural network may identify or detect abnormally shaped cells, such as sickle cells. The types of particles searched for, and thus the neural networks used for classification, may depend on a specific type of examination. For example, the images may be provided to the classification system 104 with an indication that an examination is to be performed to detect blood cell count, blood cell abnormality, or the like.

The classification system 104 may output an indication of classifications for particles within the images of the blood sample in the form of a heat map, table, or the like. For example, the indication of classification or identification may correspond to a specific region of an image, bounding box, or other location within the digitized images. Based on the output, a report may be generated indicating the presence of particular particle types and their count (e.g., red or white blood cell count), a diagnosis for a medical condition, recommended medical procedures or treatment, or the like. The report may be provided to a medical professional or patient for review.

Urine

In one embodiment, identification of particles or materials within urine samples may be performed. Urine samples may include urine from humans or any other animal. For example, urine samples from pets, wildlife, farm animals, or other animals may be analyzed for health, urine density, or disease indicators. The urine samples may be applied to a slide for imaging, or may be imaged in any other manner for a respective sampling method. Once images of the urine sample are obtained, the images may be provided to a classification system 104.

The classification system 104 may use one or more neural networks for classifying or detecting particles or materials in the images. For example, the classification system 104 may include neural networks that have been trained to identify particles or materials that may be present in a urine sample from a human or other specific animal type. In one embodiment, the neural networks may include neural networks configured to identify blood particles or cells, such as red blood cells or white blood cells. In one embodiment, the neural networks may include neural networks configured to identify sediment (such as protein, leukocytes, blood cells, or bacteria) in the urine. For example, sediment in urine may indicate a higher likelihood of a urinary tract infection for a patient. In one embodiment, a neural network is configured to detect a crystal, mineral, kidney stone, or other object or particle in the urine. In one embodiment, the neural network for processing images of urine samples is configured to detect any particulates and may classify or detect the particulate types.

In one embodiment, the urine samples may be processed using a plurality of neural networks. For example, a first neural network may identify the presence of red blood cells and/or white blood cells and a second neural network may detect crystal, mineral, or kidney stone particles. The types of particles searched for, and thus the neural networks used for classification, may depend on a specific type of examination. For example, the images may be provided to the classification system 104 with an indication that an examination is to be performed to detect symptoms of a urinary tract infection or kidney stones.

The classification system 104 may output an indication of classifications for particles within the images of the urine sample in the form of a heat map, table, or the like. For example, the indication of classification or identification may correspond to a specific region of an image, bounding box, or other location within the digitized images. Based on the output, a report may be generated indicating the presence of particular particle types and their count, a diagnosis for a medical condition, recommended medical procedures or treatment, or the like. For example, the report may indicate the presence of particles or sediment that correlates with an infection or kidney stones. The report may be provided to a medical professional or patient for review.

Sputum

In one embodiment, identification of particles or materials within sputum samples may be performed. Sputum samples may include saliva, mucus, or other material from an oral cavity or respiratory tract from a human or any other animal. For example, sputum samples from a human patient, pets, wildlife, farm animals, or other animals may be analyzed for health or disease indicators. The sputum samples may be applied to a slide for imaging, or may be imaged in any other manner for a respective sampling method. Once images of the sputum sample are obtained, the images may be provided to a classification system 104.

The classification system 104 may use one or more neural networks for classifying or detecting particles or materials in the images of the sputum sample. For example, the classification system 104 may include neural networks that have been trained to identify particles or materials that may be present in a sputum sample from a human or other specific animal type. In one embodiment, the neural networks may include neural networks configured to identify tuberculosis (TB), streptococcal pharyngitis (i.e. strep), saliva, nasal mucus, or other particles or materials present in a sputum sample. For example, the neural networks may be configured to identify cells, bacteria, or other particles or materials that may be indicators of a disease or other medical condition of a patient. In one embodiment, the sputum samples may be processed using a plurality of neural networks that have been specifically trained or are being trained to detect a specific type of cell, bacteria, particle, or material. The types of particles searched for, and thus the neural networks used for classification, may depend on a specific type of examination. For example, the images may be provided to the classification system 104 with an indication that an examination is to be performed to detect evidence of a specific disease, mucosis, or other condition.

The classification system 104 may output an indication of classifications for particles within the images of the sputum sample in the form of a heat map, table, or the like. For example, the indication of classification or identification may correspond to a specific region of an image, bounding box, or other location within the digitized images. Based on the output, a report may be generated indicating the presence of particular particle types and their count, a diagnosis for a medical condition, recommended medical procedures or treatment, or the like. The report may be provided to a medical professional or patient for review.

Infectious Disease

In one embodiment, identification of particles or materials within an infectious disease sample may be performed. Infectious disease samples may include liquid, tissue, blood, waste, or any other material from the body of a human, animal, or plant. For example, infectious disease samples may be analyzed for health, infectious disease density, or disease indicators. The infectious disease samples may be applied to a slide for imaging, or may be imaged in any other manner for a respective sampling method. Once images of the infectious disease sample are obtained, the images may be provided to a classification system 104.

The classification system 104 may use one or more neural networks for classifying or detecting particles or materials in the images. For example, the classification system 104 may include neural networks that have been trained to identify particles or materials that may be present in an infectious disease sample. In one embodiment, the neural networks may include neural networks configured to identify particles, cells or bacteria indicating the presence of one or more of malaria, tuberculosis, bone tuberculosis, red blood cell abnormalities, gonorrhea, chlamydia, yeast, trichomoniasis, babesia, bartonella, Howell-Jolly bodies, Papenheimer bodies, viral bodies, or other bacteria or particles. In one embodiment, the infectious disease samples may be processed using a plurality of neural networks that each search for a different type or classification of bacteria or particle. The types of particles searched for, and thus the neural networks used for classification, may depend on a specific type of examination. For example, the images may be provided to the classification system 104 with an indication that an examination is to be performed to detect particles that indicate that the source patient, animal, or plant may have a specific medical condition or disease.

The classification system 104 may output an indication of classifications for particles within the images of the infectious disease sample in the form of a heat map, table, or the like. For example, the indication of classification or identification may correspond to a specific region of an image, bounding box, or other location within the digitized images. Based on the output, a report may be generated indicating the presence of particular particle types and their count, a diagnosis for a medical condition or infectious disease, recommended medical procedures or treatment, or the like. The report may be provided to a medical professional or patient for review.

Cervical Mucus

In one embodiment, identification of particles or materials within cervical mucus samples may be performed. Cervical mucus samples may include cervical mucus samples obtaining using a pap smear from humans or any other animal. The cervical mucus samples may be applied to a slide for imaging, or may be imaged in any other manner for a respective sampling method. Once images of the cervical mucus sample are obtained, the images may be provided to a classification system 104.

The classification system 104 may use one or more neural networks for classifying or detecting particles or materials in the images. For example, the classification system 104 may include neural networks that have been trained to identify particles or materials that may be present in a cervical mucus sample from a human or other specific animal type. For example, the neural networks may identify cells that display potentially pre-cancerous changes, such as cervical intraepithelial neoplasia (CIN) or cervical dysplasia, the squamous intraepithelial lesion system (SIL), or the like.

In one embodiment, the neural networks may include neural networks configured to identify cancerous cell or particles or cells indicating the presence of cancer. In one embodiment, the cervical mucus samples may be processed using a plurality of neural networks to check for one or more different types of cancerous cells.

The classification system 104 may output an indication of classifications for particles within the images of the cervical mucus sample in the form of a heat map, table, or the like. For example, the indication of classification or identification may correspond to a specific region of an image, bounding box, or other location within the digitized images. Based on the output, a report may be generated indicating the presence of particular particle types and their count, a diagnosis for a medical condition (e.g., such as the presence of cancer), recommended medical procedures or treatment, or the like. The report may be provided to a medical professional or patient for review.

Vaginal Fluid

In one embodiment, identification of particles or materials within vaginal fluid samples may be performed. Vaginal fluid samples may include fluid from vaginal discharge of a human or any other animal. The vaginal fluid samples may be applied to a slide for imaging, or may be imaged in any other manner for a respective sampling method. Once images of the vaginal fluid sample are obtained, the images may be provided to a classification system 104.

The classification system 104 may use one or more neural networks for classifying or detecting particles or materials in the images. For example, the classification system 104 may include neural networks that have been trained to identify particles or materials that may be present in a vaginal fluid sample from a human or other specific animal type. In one embodiment, the neural networks may include neural networks configured to identify cells, bacteria, spores or other material or particles indicating the presence of bacterial vaginosis, candida, and/or gardenella. In one embodiment, the vaginal fluid samples may be processed using a plurality of neural networks. For example, a first neural network may identify the presence of bacterial vaginosis, a second neural network may identify the presence of candida, and a third neural network may identify the presence of gardenalia. The types of particles searched for, and thus the neural networks used for classification, may depend on a specific type of examination. For example, the images may be provided to the classification system 104 with an indication that an examination is to be performed to detect particles or density of the vaginal fluid sample that indicate that the source patient or animal may have a specific medical condition or disease.

The classification system 104 may output an indication of classifications for particles within the images of the vaginal fluid sample in the form of a heat map, table, or the like. For example, the indication of classification or identification may correspond to a specific region of an image, bounding box, or other location within the digitized images. Based on the output, a report may be generated indicating the presence of particular particle types and their count, a diagnosis for a medical condition, recommended medical procedures or treatment, or the like. The report may be provided to a medical professional or patient for review.

Milk

In one embodiment, identification of particles or materials within milk samples may be performed. Milk samples may include breast milk liquid or samples from humans or any other animal. The milk samples may be applied to a slide for imaging, or may be imaged in any other manner for a respective sampling method. Once images of the milk sample are obtained, the images may be provided to a classification system 104.

The classification system 104 may use one or more neural networks for classifying or detecting particles or materials in the images. For example, the classification system 104 may include neural networks that have been trained to identify particles or materials that may be present in a milk sample from a human or other specific animal type. In one embodiment, the neural networks may include neural networks configured to identify parasites, somatic cells (e.g., white blood cells), or the like. In one embodiment, the milk samples may be processed using a plurality of neural networks. For example, a first neural network may identify the presence of a first type of parasite, a send neural network may identify the presence of a second type of parasite, and at third neural network may identify the presence of white blood cells. The types of particles searched for, and thus the neural networks used for classification, may depend on a specific type of examination. For example, the images may be provided to the classification system 104 with an indication that an examination is to be performed to detect particles or density of the milk sample that indicate that the source patient or animal may have a specific medical condition or disease.

The classification system 104 may output an indication of classifications for particles within the images of the milk sample in the form of a heat map, table, or the like. For example, the indication of classification or identification may correspond to a specific region of an image, bounding box, or other location within the digitized images. Based on the output, a report may be generated indicating the presence of particular particle types and their count, a diagnosis for a medical condition, recommended medical procedures or treatment, or the like. The report may be provided to a medical professional or patient for review.

Semen

In one embodiment, identification of particles or materials within semen samples may be performed. Semen samples may include semen matter from humans or any other animal. For example, semen samples from pets, wildlife, farm animals, or other animals may be analyzed for health, semen count, or disease indicators. The semen samples may be applied to a slide for imaging, or may be imaged in any other manner for a respective sampling method. Once images of the semen sample are obtained, the images may be provided to a classification system 104.

The classification system 104 may use one or more neural networks for classifying or detecting particles or materials in the images. For example, the classification system 104 may include neural networks that have been trained to identify particles or materials that may be present in a semen sample from a human or other specific animal type. In one embodiment, the neural networks may include neural networks configured to identify sperm morphology or other indications of fertility of the source patient or animal. In one embodiment, the semen samples may be processed using a plurality of neural networks. For example, a first neural network may identify the presence of normal sperm and a second neural network may determine a presence of abnormal sperm. The types of particles searched for, and thus the neural networks used for classification, may depend on a specific type of examination. For example, the images may be provided to the classification system 104 with an indication that an examination is to be performed to detect particles or sperm count that may indicate that the source patient or animal may have a specific medical condition or disease.

The classification system 104 may output an indication of classifications for particles within the images of the semen sample in the form of a heat map, table, or the like. For example, the indication of classification or identification may correspond to a specific region of an image, bounding box, or other location within the digitized images. Based on the output, a report may be generated indicating the presence of particular particle types and their count (e.g., sperm count or percentage of abnormal sperm), a diagnosis for a medical condition, recommended medical procedures or treatment, or the like. The report may be provided to a medical professional or patient for review.

Geology

In one embodiment, identification of particles or materials within geological samples may be performed. Geological samples may include dirt, soil, rock, oil or other liquid or other material from the earth or other geological or ecological location. The geological samples may be applied to a slide for imaging, or may be imaged in any other manner corresponding to a respective sampling method. Once images of the geological sample are obtained, the images may be provided to a classification system 104.

The classification system 104 may use one or more neural networks for classifying or detecting particles or materials in the images. For example, the classification system 104 may include neural networks that have been trained to identify particles or materials that may be present in a geological sample. In one embodiment, the neural networks may include neural networks configured to identify dinoflagellates, specific mineral or crystal types, oil, types of soil particles (sand, clay, or biological matter), or the like. In one embodiment, the geological samples may be processed using a plurality of neural networks. For example, a first neural network may identify the presence of oil particles or molecules and a second neural network may determine the presence of specific types of minerals or crystals. The types of particles searched for, and thus the neural networks used for classification, may depend on a specific type of examination.

The classification system 104 may output an indication of classifications for particles within the images of the geological sample in the form of a heat map, table, or the like. For example, the indication of classification or identification may correspond to a specific region of an image, bounding box, or other location within the digitized images. Based on the output, a report may be generated indicating the presence of particular particle types and their count, a soil health condition or a specific purpose (e.g., crops), a recommended remediation procedure, or the like. The report may be provided to a farmer or scientist for review.

Forensics

In one embodiment, identification of particles or materials within forensic samples may be performed. Forensic samples may include forensic matter from a crime scene or other forensic scene or investigation. For example, forensic samples from carpet, furniture, floors, clothes, shoes, tires, jewelry, hair, mail, or the like may be obtained for legal, historical, or other purposes. The forensic samples may be applied to a slide for imaging, or may be imaged in any other manner for a respective sampling method. In one embodiment, camera images using a conventional camera may be obtained. For example, camera images of tire tracks, fingerprints, shoe footprints, tracks, or other evidence may be taken and analyzed. Once images of the forensic sample are obtained, the images may be provided to a classification system 104.

The classification system 104 may use one or more neural networks for classifying or detecting particles or materials in the images. For example, the classification system 104 may include neural networks that have been trained to identify particles or materials that may be present in a forensic sample. In one embodiment, the neural networks may include neural networks configured to identify drugs, anthrax, blood, minerals, fibers, clothing, shoe rubber, crystals, semen, hair, plant matter, biological mater, or other particles or substances. In one embodiment, the neural networks may identify a type of particle or material. In one embodiment, neural networks or matching algorithms may be used to match drugs, anthrax, blood, minerals, fibers, clothing, shoe rubber, crystals, semen, hair, plant matter, biological mater, or other particles or substances at one location with samples or material obtained from another location. For example, shoeprints, shoe patterns, fingerprints, tires (tire tracks), fibers, clothing, hair, semen, blood, or other matter may be matched with those of a subject or suspect. In one embodiment, an image of a forensic sample and a reference image (e.g., of known material gathered from another location or suspect) may be fed into a neural network for detecting the similarity or matching of the particles, materials, or items.

The types of particles searched for, and thus the neural networks used for classification, may depend on a specific type of examination. For example, the images may be provided to the classification system 104 with an indication that an examination is to be performed to detect particles or density of the forensic sample that indicate that the source patient or animal may have a specific medical condition or disease.

The classification system 104 may output an indication of classifications for particles within the images of the forensic sample in the form of a heat map, table, or the like. For example, the indication of classification or identification may correspond to a specific region of an image, bounding box, or other location within the digitized images. Based on the output, a report may be generated indicating the presence of particular particle types and their count, a similarity between particles, materials, or items, or the like. The report may be provided to an investigator or customer for review.

Agriculture

In one embodiment, identification of particles or materials within agriculture samples may be performed. Agriculture samples may include agriculture matter from soils (e.g., soil samples), dirt, fertilizers, or other materials used during the planting and growing of crops. The agriculture samples may be applied to a slide for imaging, or may be imaged in any other manner for a respective sampling method. Once images of the agriculture sample are obtained, the images may be provided to a classification system 104.

The classification system 104 may use one or more neural networks for classifying or detecting particles or materials in the images. For example, the classification system 104 may include neural networks that have been trained to identify particles or materials that may be present in an agriculture sample. In one embodiment, the neural networks may include neural networks configured to particles (or organisms) such as nematodes, pollen, bacteria, protozoa, cancerous cells, or the like in a soil sample or other agriculture sample. In one embodiment, the agriculture samples may be processed using a plurality of neural networks. For example, a first neural network may identify the presence of nematodes, a second neural network may identify the presence of pollen, and a third neural network may identify the presence of bacteria, or the like. The types of particles searched for, and thus the neural networks used for classification, may depend on a specific type of examination.

The classification system 104 may output an indication of classifications for particles within the images of the agriculture sample in the form of a heat map, table, or the like. For example, the indication of classification or identification may correspond to a specific region of an image, bounding box, or other location within the digitized images. Based on the output, a report may be generated indicating the presence of particular particle types and their count, a diagnosis for soil or plant health, a recommended remediation procedure or soil treatment, or the like.

Insect or Small Animal

In one embodiment, identification of particles or materials within insect or small animal samples may be performed. Insect or small animal samples may include full bodies, portions of bodies, larvae, eggs, or the like of insects or small animals found in soil, air, water, food, plant, ecological environment, or other location. For example, the samples may include adult, egg, larvae, or other life stages of insects or small animals. The insect or small animal samples may be applied to a slide for imaging, or may be imaged in any other manner for a respective sampling method. For example, the insect/animal bodies, eggs, larvae or the like may be (knowingly or unknowingly) gathered separately or within another material, such as a dirt, liquid, or other material. Once images of the insect or small animal sample are obtained, the images may be provided to a classification system 104.

The classification system 104 may use one or more neural networks for classifying or detecting particles or materials in the images. For example, the classification system 104 may include neural networks that have been trained to identify the body, the portions of a body of an insect or small animal, or the eggs or larvae within the insect or small animal sample. In one embodiment, the neural networks may include neural networks configured to identify adult insects, eggs, larvae. For example, neural networks may be used to identify an adult mosquito, a mosquito egg or larvae, or the like. In one embodiment, a neural network may distinguish between a male and female mosquito (or other insect or animal). In one embodiment, the neural networks may include neural networks configured to identify adult insects (or their larvae or eggs) of different types. For example, mosquitoes, bed bugs, tics, or other insects may be identified and classified.

In one embodiment, the neural networks may include neural networks configured to identify and classify or detect small animals, such as nematodes, and/or their eggs. In one embodiment, the neural networks may include neural networks configured to classify or detect the insect or small animal as of a specific type so that different types of undesirable insects or animals can be distinguished from benign or beneficial insects or animals.

In one embodiment, the insect or small animal samples may be processed using a plurality of neural networks. For example, a first neural network may identify the presence of a specific type of mosquito or insect, second neural network identifies the presence of a specific type mosquito or insect larva or egg, and a third neural network may identify the presence of a specific type of animal. The types of particles searched for, and thus the neural networks used for classification, may depend on a specific type of examination. For example, the images may be provided to the classification system 104 with an indication that an examination is to be performed to detect mosquito eggs or larvae.

The classification system 104 may output an indication of classifications for particles within the images of the insect or small animal sample in the form of a heat map, table, or the like. For example, the indication of classification or identification may correspond to a specific region of an image, bounding box, or other location within the digitized images. Based on the output, a report may be generated indicating the presence of particular particle types and their count (e.g., mosquito larvae count), recommended remediation procedures or treatment for a location, or the like.

EXAMPLES

The following examples pertain to further embodiments.

Example 1 is a method that includes receiving a plurality of microscopy images of a specimen and a classification for the specimen, the plurality of microscopy images including a first image captured at a first magnification and a second image captured at the first magnification with a different focus than the first image. The method further includes training a machine learning model or algorithm using the plurality of images, wherein the first image and the second image are provided with one or more labels indicating the classification.

In Example 2, the receiving the plurality of microscopy images of the specimen as of Example 1 includes capturing the plurality of images of the specimen. Capturing the first image includes capturing at the first magnification with a first focal plane or focal depth. Capturing the second image includes capturing at the first magnification with a second focal plane or focal depth different than the first focal plane or focal depth.

In Example 3, the capturing the plurality of microscopy images of the specimen as of Example 2 includes capturing microscopy images of a sample by: capturing a plurality of images with different focal planes of a first region; and capturing a plurality of images with different focal planes of a second one or more regions, such that each captured region has a plurality of corresponding images with different focal planes.

In Example 4, each captured region of Example 3 has a plurality of corresponding images with different focal planes including five or more different focal planes or focal depths.

In Example 5, the training the machine learning model or algorithm in any of Examples 1-4 includes providing the first image with the classification as ground truth and providing the second image with the classification as ground truth.

In Example 6, the method of any of Examples 1-5 further includes determining the classification. Determining the classification includes determining a classification based on data not included in the plurality of microscopy images.

In Example 7, the machine learning model or algorithm in any of Examples 1-6 includes a deep neural network and training the deep neural network includes training using a back-propagation algorithm.

In Example 8, the specimen in any of Examples 1-7 includes a particle. Wherein the classification includes a classification for the particle, and wherein training includes training the machine learning model or algorithm to determine a classification of a particle.

Example 9 is an apparatus or system including means to perform a method as in any of Examples 1-8.

Example 10 is a machine-readable storage including machine-readable instructions that, when executed, implement a method or realize an apparatus or system as in any of Examples 1-9.

Various techniques, or certain aspects or portions thereof, may take the form of program code (i.e., instructions) embodied in tangible media, such as floppy diskettes, CD-ROMs, hard drives, a non-transitory computer readable storage medium, or any other machine readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, include one or more physical or logical blocks of computer instructions, which may, for instance, be organized as an object, a procedure, or a function. Nevertheless, the executables of an identified component need not be physically located together, but may include disparate instructions stored in different locations that, when joined logically together, include the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Implementations of the disclosure can also be used in cloud computing environments. In this application, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, or any suitable characteristic now known to those of ordinary skill in the field, or later discovered), service models (e.g., Software as a Service (SaaS), Platform as a Service (PaaS), Infrastructure as a Service (IaaS)), and deployment models (e.g., private cloud, community cloud, public cloud, hybrid cloud, or any suitable service type model now known to those of ordinary skill in the field, or later discovered). Databases and servers described with respect to the disclosure can be included in a cloud model.

Reference throughout this specification to "an example" means that a particular feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another, but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive.

Those having skill in the art will appreciate that many changes may be made to the details of the above-described embodiments without departing from the underlying principles of the disclosure. The scope of the present disclosure should, therefore, be determined only by the claims, if any.

The invention claimed is:

1. A method comprising:
receiving a specimen sample disposed on a slide, the slide including a slide label indicating a classification for the specimen;
imaging the specimen sample disposed on the slide;
receiving a plurality of microscopy images of the specimen sample and classification for the specimen sample, the plurality of microscopy images comprising a first image captured at a first magnification and a second image captured at the first magnification with a different focal depth than the first image, wherein the focal depth for the second image overlaps with a focal depth of the first image;
training a machine learning model or algorithm using the plurality of images, wherein the training further includes providing the first image and the second image with overlapping focal depths to the machine learning model or algorithm with the classification of the specimen sample;
labeling the plurality of microscopy images with image labels indicating the classification of the sample specimen; and
associating the slide label with the image labels on the plurality of microscopy images, the slide label further identifying a region of the slide from which the plurality of microscopy images were imaged.

2. The method of claim 1, wherein receiving the plurality of microscopy images of the sample specimen comprises capturing the plurality of images of the sample specimen, wherein:
capturing the first image comprises capturing at the first magnification with a first focal plane; and
capturing the second image comprises capturing at the first magnification with a second focal plane different than the first focal plane.

3. The method of claim 2, wherein capturing the plurality of microscopy images of the specimen sample comprises capturing microscopy images of a specimen sample by:
capturing a plurality of images with different focal planes of a first region of the slide; and
capturing a plurality of images with different focal planes of a second one or more regions of the slide, such that each captured region of the slide has a plurality of corresponding images with different focal planes.

4. The method of claim 3, wherein each captured region of the slide has a plurality of corresponding images with different focal planes comprising two or more different focal planes.

5. The method of claim 1, wherein training the machine learning model or algorithm comprises:
providing the first image with the classification as ground truth; and
providing the second image with the classification as ground truth.

6. The method of claim 1, further comprising determining the classification, wherein determining the classification comprises determining a classification based on data not included in the plurality of microscopy images.

7. The method of claim 1, further comprising determining the classification, wherein determining the classification comprises determining a classification based on a combination of data found in two or more of the plurality of microscopy images.

8. The method of claim 1, wherein the machine learning model or algorithm comprises a deep neural network, wherein training the deep neural network comprises training using a back-propagation algorithm.

9. The method of claim 1, wherein the specimen comprises a particle, wherein the classification comprises a classification for the particle, and wherein training comprises training the machine learning model or algorithm to determine a classification for a particle.

10. A system for training a neural network, the system comprising:
one or more processors; and
non-transitory computer readable storage media storing instructions that, when executed by one or more processors, cause the one or more processors to:
image a specimen sample disposed on a slide, the slide including a slide label indicating a classification for the specimen sample;
receive a plurality of microscopy images of the specimen sample and the classification for the specimen sample, the plurality of microscopy images comprising a first image captured at a first magnification and a second image captured at the first magnification with a different focal depth than the first image, wherein the focal depth for the second image overlaps with a focal depth of the first image; and
train a machine learning model or algorithm using the plurality of images, wherein the training further includes providing the first image and the second image with overlapping focal depths to the machine learning model or algorithm with the classification of the specimen sample;
labeling the plurality of microscopy images with image labels indicating the classification of the sample specimen; and
associating the slide label with the image labels on the plurality of microscopy images, the slide label further identifying a region of the slide from which the plurality of microscopy images were imaged.

11. The system of claim 10, wherein receiving the plurality of microscopy images of the sample specimen comprises capturing the plurality of images of the sample specimen, wherein the instructions cause the one or more processors to control an imaging system to:
capture the first image at the first magnification with a first focal plane; and
capture the second image at the first magnification with a second focal plane different than the first focal plane.

12. The system of claim 11, wherein capturing the plurality of microscopy images of the specimen sample comprises capturing microscopy images of a specimen sample by:
capturing a plurality of images with different focal planes of a first region of the slide; and
capturing a plurality of images with different focal planes of a second one or more regions of the slide, such that each captured region of the slide has a plurality of corresponding images with different focal planes.

13. The system of claim 12, wherein each captured region of the slide has a plurality of corresponding images with different focal planes comprising two or more different focal planes.

14. The system of claim 10, wherein the instructions cause the one or more processors to train the machine learning model or algorithm by:
providing the first image with the classification as ground truth; and providing the second image with the classification as ground truth.

15. The system of claim 10, wherein the instructions cause the one or more processors to determine the classification, wherein determining the classification comprises obtaining classification information based on data not included in the plurality of microscopy images.

16. The system of claim 10, wherein training the machine learning model or algorithm comprises training a deep neural network, wherein training the deep neural network comprises training using a back-propagation algorithm.

17. Non-transitory computer readable storage media storing instructions that, when executed by one or more processors, cause the one or more processors to:
 obtain microscopy images of a specimen sample disposed on a slide having a slide label indicating a classification for the specimen sample, wherein obtaining microscopy image comprises, for one or more regions of the sample:
 capturing a first image of the specimen sample with a first focal depth at a first magnification;
 capturing one or more additional images with one or more additional focal depths at the first magnification, wherein the first focal depth overlaps at least one of the one or more additional focal depths;
 training a neural network using the first image and the one or more additional images, wherein the training further includes providing the first image and the one or more additional images with the overlapping focal depths to the neural network with the classification of the specimen sample;
 labeling the first image and the one or more additional images with image labels indicating the classification of the sample specimen; and
 associating the slide label with the image labels on the first image and the one or more additional images, the slide label for the first image including ground truth for the first image and the slide label for the one or more additional images identifies a same region and same specimen captured in the first image and the one or more additional images.

18. The computer readable storage media of claim 17, wherein the instructions cause the one or more processors to train the machine learning model or algorithm by training a deep neural network, wherein training the deep neural network comprises training using a back-propagation algorithm.

19. The computer readable storage media of claim 17, wherein the instructions cause the one or more processors to determine the classification, wherein determining the classification comprises obtaining classification information based on data not included in the plurality of microscopy images.

20. The computer readable storage media of claim 17, wherein each of the one or more regions has a plurality of corresponding images with different focal planes comprising two or more different focal planes.

* * * * *